US012343300B2

(12) United States Patent
Truckai et al.

(10) Patent No.: US 12,343,300 B2
(45) Date of Patent: Jul. 1, 2025

(54) SYSTEMS FOR TREATING PEYRONIES DISEASE

(71) Applicant: Kemeny Healthcare Inc., San Jose, CA (US)

(72) Inventors: Csaba Truckai, Saratoga, CA (US); Akos Toth, Cupertino, CA (US)

(73) Assignee: Kemeny Healthcare Inc., San Jose, CA (US)

( * ) Notice: Subject to any disclaimer, the term of this patent is extended or adjusted under 35 U.S.C. 154(b) by 703 days.

(21) Appl. No.: 17/303,082

(22) Filed: May 19, 2021

(65) Prior Publication Data

US 2021/0369552 A1 Dec. 2, 2021

Related U.S. Application Data

(60) Provisional application No. 63/036,905, filed on Jun. 9, 2020, provisional application No. 63/030,728, filed on May 27, 2020.

(51) Int. Cl.
*A61H 19/00* (2006.01)
*A61H 23/00* (2006.01)

(52) U.S. Cl.
CPC ........... *A61H 19/32* (2013.01); *A61H 23/008* (2013.01); *A61H 2201/1659* (2013.01)

(58) Field of Classification Search
CPC .... A61B 17/225–2258; A61B 17/2251; A61H 23/008
See application file for complete search history.

(56) References Cited

U.S. PATENT DOCUMENTS

| | | | | |
|---|---|---|---|---|
| 5,513,652 | A * | 5/1996 | Schwartz | A61F 5/41 128/842 |
| 5,803,897 | A * | 9/1998 | Mooreville | A61F 2/26 600/40 |
| 6,642,274 | B1 * | 11/2003 | Neal | A61K 31/5575 514/573 |
| 10,441,499 | B1 * | 10/2019 | Zhu | G10K 15/06 |
| 2012/0215142 | A1 * | 8/2012 | Spector | A61B 17/2251 601/46 |
| 2016/0235580 | A1 * | 8/2016 | Trost | A61F 5/41 |
| 2017/0136144 | A1 * | 5/2017 | Herr | A61L 24/0031 |
| 2017/0296209 | A1 * | 10/2017 | Morganstern | A61K 41/0028 |
| 2018/0296383 | A1 * | 10/2018 | Blanche | A61H 19/44 |
| 2018/0345012 | A1 * | 12/2018 | Schwarz | A61N 2/002 |
| 2019/0336162 | A1 * | 11/2019 | Zahalsky | A61B 90/11 |
| 2020/0093857 | A1 * | 3/2020 | Morganstern | A61K 31/522 |
| 2021/0196561 | A1 * | 7/2021 | Podhorsky | A61B 17/225 |
| 2022/0331142 | A1 * | 10/2022 | Paz | A61N 7/00 |

OTHER PUBLICATIONS

Wessels, Vacuum Erection Devices, 2006, Male Sexual Function, Current Clinical Urology, Humana Press, pp. 323-330 (Year: 2006).*
Mauro et al, Jul. 2021, Penile length and circumference dimensions: A large study in young Italian men, Andrologia 53(6) (Year: 2021).*
Shimpi et al., “Role of extracorporeal shock wave therapy in management of Peyronie’s disease: A preliminary report”, 2016 (Year: 2016).*

* cited by examiner

*Primary Examiner* — Adil Partap S Virk
(74) *Attorney, Agent, or Firm* — Levine Bagade Han LLP

(57) ABSTRACT

Systems and methods for treating Peyronie’s disease, including systems for generating acoustic shock waves within an enclosed negative pressure chamber to fragment or otherwise modify plaque in a patient’s penile shaft.

27 Claims, 4 Drawing Sheets

SYSTEMS FOR TREATING PEYRONIES DISEASE

RELATED APPLICATION

This application is a non-provisional of U.S. Provisional Application No. 63/030,728 filed May 27, 2020 and U.S. Provisional Application No. 63/036,905 filed Jun. 9, 2020, the entirety of both of which are incorporated by reference.

BACKGROUND FIELD OF THE INVENTION

The present invention relates to systems and methods for treating Peyronie's disease and, more particularly, to systems for generating acoustic shock waves within an enclosed negative pressure chamber to fragment or otherwise modify plaque in a patient's penile shaft.

BACKGROUND OF THE INVENTION

High intensity acoustic waves are known in the art for imparting mechanical forces to soft tissues in patients for treating acute and chronic conditions. Shock waves, as used in medical therapies, consist of intense pressure pulses that can be transmitted through any elastic media, such as human tissue. Acoustic shock waves are well known in urology, where such high intensity pressure pulses are adapted for fragmenting kidney stones. Shock wave therapy is also known in the field of treating erectile dysfunction (ED) where shock waves have been shown to be effective by increasing the arterial blood flow and stimulate revascularization within the two corpora cavernosa. The delivery of such acoustic energy also can fragment or soften scar tissue, and thereby enhance repair processes in soft tissues. Shock waves are characterized by instant changes in pressure when delivered to soft tissue, together with high amplitude and non-periodicity. Such shock waves can be created by various mechanisms such as electromagnets, compressed air, or electrical energy adapted to create vacuum bubbles in fluids.

Several mechanisms of action have been described for high intensity acoustic waves in soft tissue. In one aspect, acoustic waves can initiate and maintain tissue repair processes in aging or damaged tissues resulting from enhanced expression of growth factors such as the VEGF, PCNS, BMP etc. following delivery of such acoustic energy. As a result of these processes, blood vessels may be stimulated to grow which in turn can improve blood supply and oxygenation of the treated tissue. In another aspect, acoustic waves can treat plaque in blood vessels to improve blood flow in a patient's vasculature. In another aspect, shockwaves may cause the dissolution of calcified fibroblasts in some tissues. Acoustic waves may break up such existing calcifications which then can be removed by the lymphatic system.

BRIEF DESCRIPTIONS OF THE DRAWINGS

The present invention will be more fully appreciated and understood from the following detailed description of the present invention when viewed in conjunction with the accompanying figures, in which.

SUMMARY OF THE INVENTION

Figure 1:
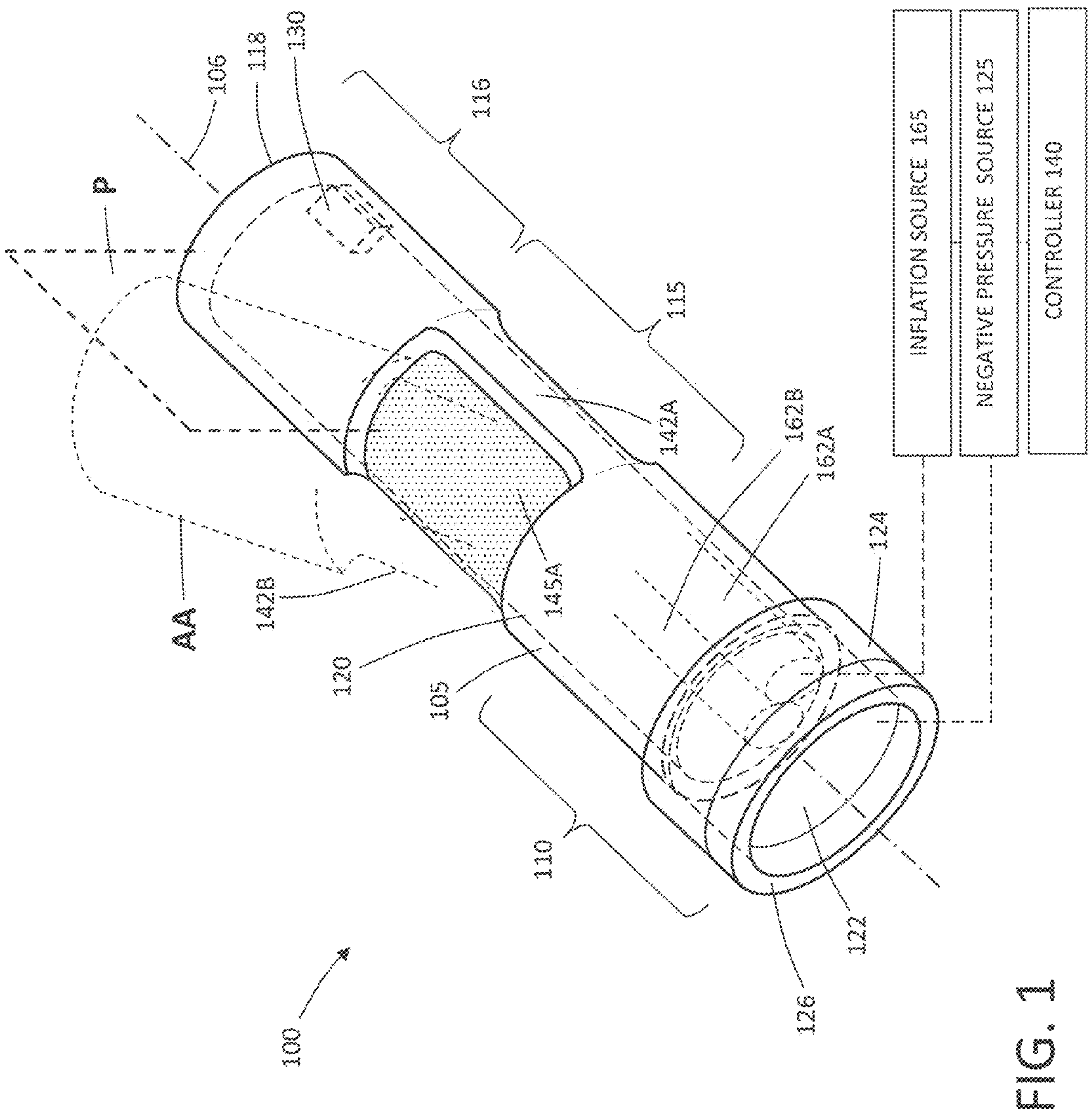
FIG. 1 is a perspective view of an acoustic device adapted for treatment of a Peyronie's disease by fragmenting and softening plaque in a patient's penile shaft, wherein the device has bendable central tubular portion with an interior chamber configured to receive the penile shaft.

The present disclosure includes methods of treating a penile shaft for therapeutic purposes. For example, such a method can include treating Peyronie's disease by positioning a penile shaft of a patient in an interior chamber of a device; causing negative pressure in the interior chamber around the penile shaft for an interval sufficient to increase blood inflow to thereby distend a corporal sinusoid; and applying shock waves from an acoustic emitter to plaque in the penile shaft.

In one variation, the negative pressure applied can range from 50 mm Hg to 250 mm Hg. However, any range is within the scope of this disclosure. The acoustic emitter can be moved over the plaque either manually or automatically.

The shock wave can be generated using an acoustic emitter that is moved over the plaque. In one example applying the shock wave comprises applying the shock wave over a selected interval at a frequency of 1 to 5 Hz with an energy intensity of 0.10 mJ/mm2 to 0.30 mJ/mm2. In another variation, the selected interval can range between 1 minute and 30 minutes. However, any interval range is within the scope of this disclosure. The shock waves applied by the method can modify the plaque.

In another variation, the selected interval, frequency, and energy are delivered in a series of treatments over time.

In a further variation, the method of treating Peyronie's disease includes positioning and causing the negative pressure in the interior chamber to dispose the penile shaft in the interior chamber with distended corporal sinusoids but an otherwise non-tensioned shape.

The shock waves can be preceded by or contemporaneous with tensioning the penile shaft to thereby tension the plaque. Such tensioning can include straightening the penile shaft. In an additional variation, the penile shaft is moved between non-tensioned and tensioned shaped during applying shockwaves.

Another variation of treating Peyronie's disease can include positioning a penile shaft of a patient in a chamber; causing negative pressure in the chamber around the penile shaft for an interval sufficient to increase blood inflow to thereby distend a corporal sinusoid; straightening the penile shaft; and applying shock waves from an acoustic emitter to plaque in the penile shaft.

The present disclosure also includes acoustic tissue treatment systems. For example, such a system can comprise an elongate tubular member extending about a central axis with an interior chamber having a proximal open end and a distal closed end configured for receiving a shaft of a mammalian penis; wherein a middle portion of the elongate tubular member is bendable relative to the central axis; a negative pressure source in communication with the interior chamber; and a shockwave device adapted to deliver energy from an emitter to the shaft.

A variation of the system includes a handheld system for manually positioning the emitter in contact with a contact structure of the elongate tubular member. In an additional variation, the shockwave device is coupled to the tubular member for automated positioning of the emitter in contact with the contact structure. The contact structure can comprise a thin wall portion of the elongate tubular member interfacing the interior chamber.

The present disclosure also includes one or more controllers for controlling an operating parameter of the shockwave device.

DETAILED DESCRIPTION OF THE INVENTION

The following detailed description describes currently contemplated modes of carrying out the invention. The description is not limiting but is made for the purpose of illustrating the general principles of the invention.

FIG. 1 illustrates an acoustic treatment system 100 comprising an elongate tubular member 105 extending about central or longitudinal axis 106 from a proximal portion 110 extending to a medial portion 115 and a distal portion 116 having a closed distal end 118 to thereby provide an interior chamber 120 therein. The interior chamber 120 has an opening 122 in the proximal end 124 of the tubular member which is dimensioned to receive and accommodate a flaccid or erect penile shaft of a patient. A sponge-like cuff 126 is typically provided around the open proximal end 122 of the interior chamber 120.

Figure 2:
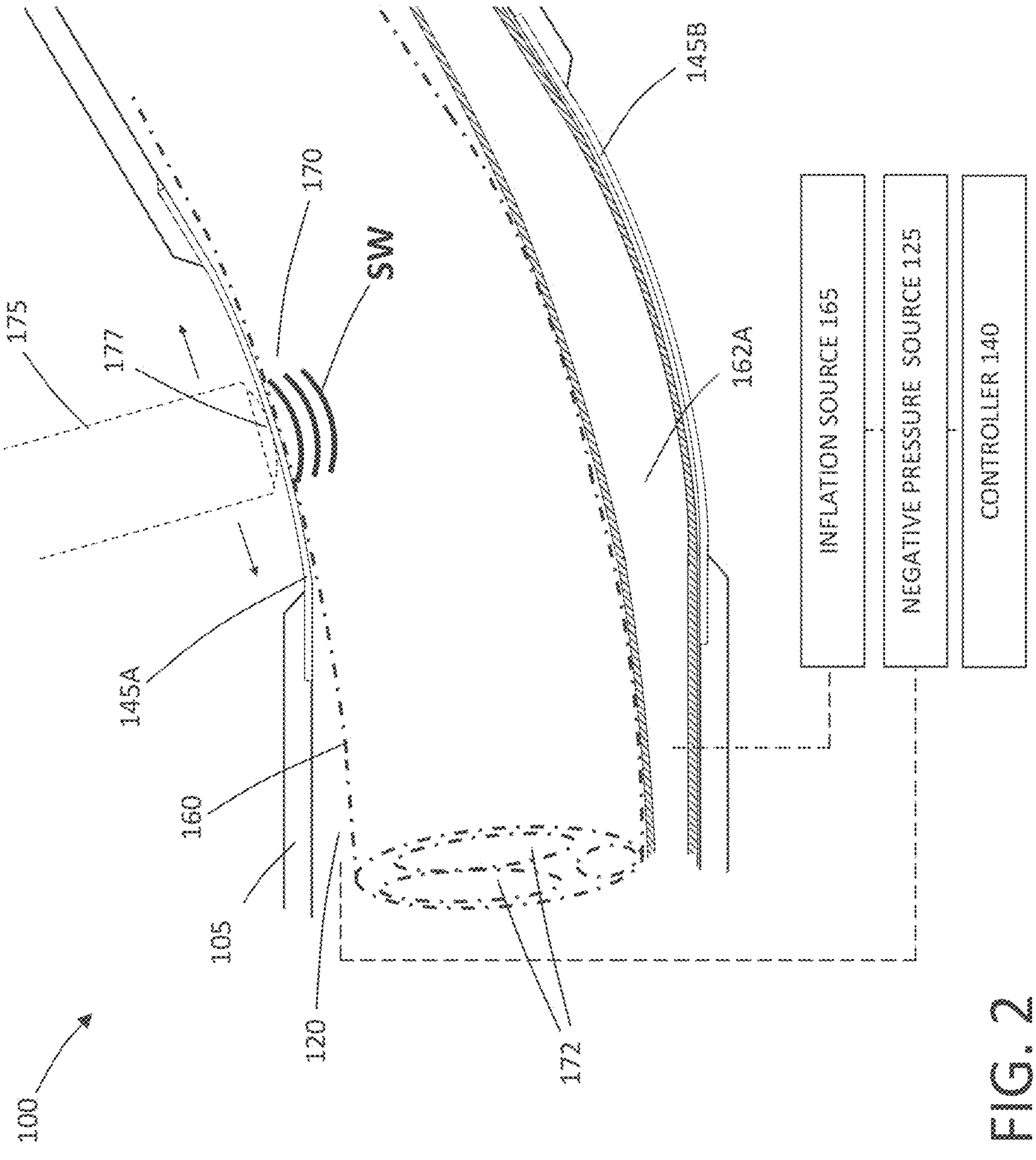
FIG. 2 is a longitudinal sectional view of central portion of the acoustic treatment device of FIG. 1 in a flexed position with a penile shaft in a negative pressure chamber of the device showing shock waves being applied to plaque in the penile shaft.

In this variation, referring to FIGS. 1 and 2, a negative pressure source 125 is provided for evacuating air from the interior chamber 120. The negative pressure source 125 can be remote from the device and coupled to the device through tubing, or a pump 130 can be disposed in the distal portion 116 of the tubular member 105. The negative pressure source 125 is further described below and is controlled by a controller 140.

As can be seen in FIG. 1, the central portion 115 of the tubular member 105 is flexible in at least one plane P with bi-lateral flexible or deformable side walls indicated at 142A and 142B. The cylindrical portions of the proximal portion 110 and distal portion 116 of the tubular member 105 comprise a rigid material, such as a polymer or metal. The sidewalls of 142A and 142B can be formed of any suitable material such as a polymer or metal with a suitable rectangular, oval or around cross-section to allow such bending. The sidewalls 142A and 142B are designed to be malleable, that is after bending to a particular shape, the sidewalls will maintain that shape until manually straightened. Such bending is adapted to accommodate a bent penile shaft 160 (FIG. 2) that has a similar bend without tensioning such a deformed penile shaft 160. The central portion 115 of member the tubular 105 includes an anterior thin wall surface element 145A that can be an elastomer. This thin wall element 145A spans the anterior space between the bendable sidewalls 142A and 142B. Similarly, the corresponding posterior space between the sidewalls is spanned by thin wall element 145B (FIG. 2) that also can be an elastomer. The elastomeric material can be any strong thin material that is fluid impermeable to allow a negative pressure within the interior chamber 120. Typically, the thin wall material can be silicone or a similar material. These elements allow the tubular member 105 to bend in the central portion 115 as shown in phantom view outline AA in FIG. 1. Typically, the tubular member 105 is bent or deflected manually by the physician prior to receiving the patient's penile shaft. As will be described below, the tubular member 105 while engaging the penile shaft 160 also may be straightened from the bent shape to a straighter shape to tension the targeted plaque while delivering shock waves.

In other variations, the tubular member 105 can be configured with sensors coupled to the controller 140 to record the degree of bending of the tubular member, for example in a degrees from linearity, in a treatment to eventually compare treatment sessions from one to another where the first session the patient's penile shaft in a first degree of bending and in a subsequent treatment, the bending may be reduced. In another variation, the exterior of the tubular member 105 can carry an angle indicator (not shown) to indicate the angle of bending of the tubular member 105 can be recorded manually by the physician or operator. Typically, the treatment of Peyronie's disease will require a series of 4 to 12 shock waves treatment sessions. Thus, the thin wall contact elements 145A and 145B form wall portions of the fluid tight wall of the tubular member 105 to allow a negative pressure to be maintained therein. The thin wall contact element or structure 145A extends radially around the tubular member 105 at least 60°. and extends axially at least 10 mm. The tubular member 105 is bendable at least 10° in the medial section 115.

As can be seen further seen in FIGS. 1 and 2, in one variation, the interior chamber 120 carries one or more fluid-filled chambers or bladders 162A and 162B that communicate with an inflation source 165. The bladders 162A, 162B are expandable either manually or by a motor-driven pump wherein the expandable bladder displaces and positions the penile shaft 160 in interior chamber 120 against the thin wall element 145A of the tubular member 105 (FIG. 2). In one variation, the bladders 162A, 162B are filled with a liquid rather than a gas, as a liquid will be less compressible that allow for shock waves to be delivered to the penile shaft 160 more effectively.

Now referring to FIG. 2, a schematic sectional view is shown of the system 100 in a method of use. Initially, the elongated tubular member 105 is bent to a shape that corresponds to the curved, repose shape of a patient's penile shaft 160 and the penile shaft is inserted into the interior chamber 120. In FIG. 2, the penile shaft 160 has scar tissue or plaque 170 therein which causes the bend in the shaft. The proximal end of the tubular member 105 with a resilient element 126 around the opening 122 is pressed against the patient's body to create a closed space within the interior chamber 120 (FIG. 1). In a subsequent step of the method, the negative pressure source 125 is actuated to greater negative pressure in the interior chamber 120. The air in the interior chamber and is 120 can evacuated through tubing coupled to the negative pressure source 125 or by the pump 130 through one-way valves or vents (not shown), e.g., in the distal portion 116 of the device (FIG. 1). The negative pressure will assist in blood flow into the corporal sinusoids or corpus cavernosa 172 of the penile shaft 160 to create an erect shaft in the interior chamber 120. In another step, the inflation source 155 is used to expand the bladder or bladders 162A and 162B the inferior side of the tubular member 105 to thereby press the targeted region and plaque 170 of the penile shaft 160 into contact with the anterior thin wall member 145A. Thereafter, a hand-held shock wave device 175 is held by the physician and the working end with acoustic emitter 177 is brought into contact with the thin wall member 145A overlying the penile shaft 160 plaque 170 in shock waves SW are applied. The physician then moves the working end of a shockwave device axially and radially over the thin wall member 145A to apply shock waves over the entire surface of the targeted area and plaque 170 in the penile shaft 160.

Referring to FIG. 2, the acoustic emitter can be a handheld acoustic device 175, which for example, can be a shockwave GentlePro or other similar device available from Zimmer Aesthetics, Junkersstraße 9, Neu-Ulm, Germany 89231. In FIG. 2, the acoustic device has an acoustic tip 177 that is configured for engagement with tissue to transmit shockwaves SW to such tissue. In one variation of the method of the invention, the physician can straighten the penile shaft 160 thereby tensioning the plaque 170 while delivering shock waves. By this method, the shock waves may enhance the fragmentation of the plaque 170 by treatment while being manipulated between tensioned and non-tensioned conditions.

In general, a method of treating Peyronie's disease comprises positioning a patient's penile shaft in an interior chamber of a device, causing negative pressure in the chamber around the penile shaft for an interval sufficient to increase blood inflow to thereby distend the corporal sinusoids, and applying shock waves from an acoustic emitter to plaque in the penile shaft. In the method, the negative pressure is from 50 mm Hg to 250 mm Hg. The method provides for manual or automated movement of the acoustic emitter over the plaque.

The method applies step applies shock waves over a selected time interval at a frequency of 1 to 5 Hz with an energy intensity of 0.10 $mJ/mm^2$ to 0.30 $mJ/mm^2$. The selected interval can be from 1 minute to 30 minutes and can be repeated over time. A treatment session can consist of the application of from 500 to 5,000 shockwaves.

The method further comprises disposing the penile shaft in the interior chamber with distended corporal sinusoids but an otherwise non-tensioned shape. The method further comprised tensioning the penile shaft to thereby tension the plaque, where the tension ca be caused by straightening or lengthening the penile shaft.

Figure 3:
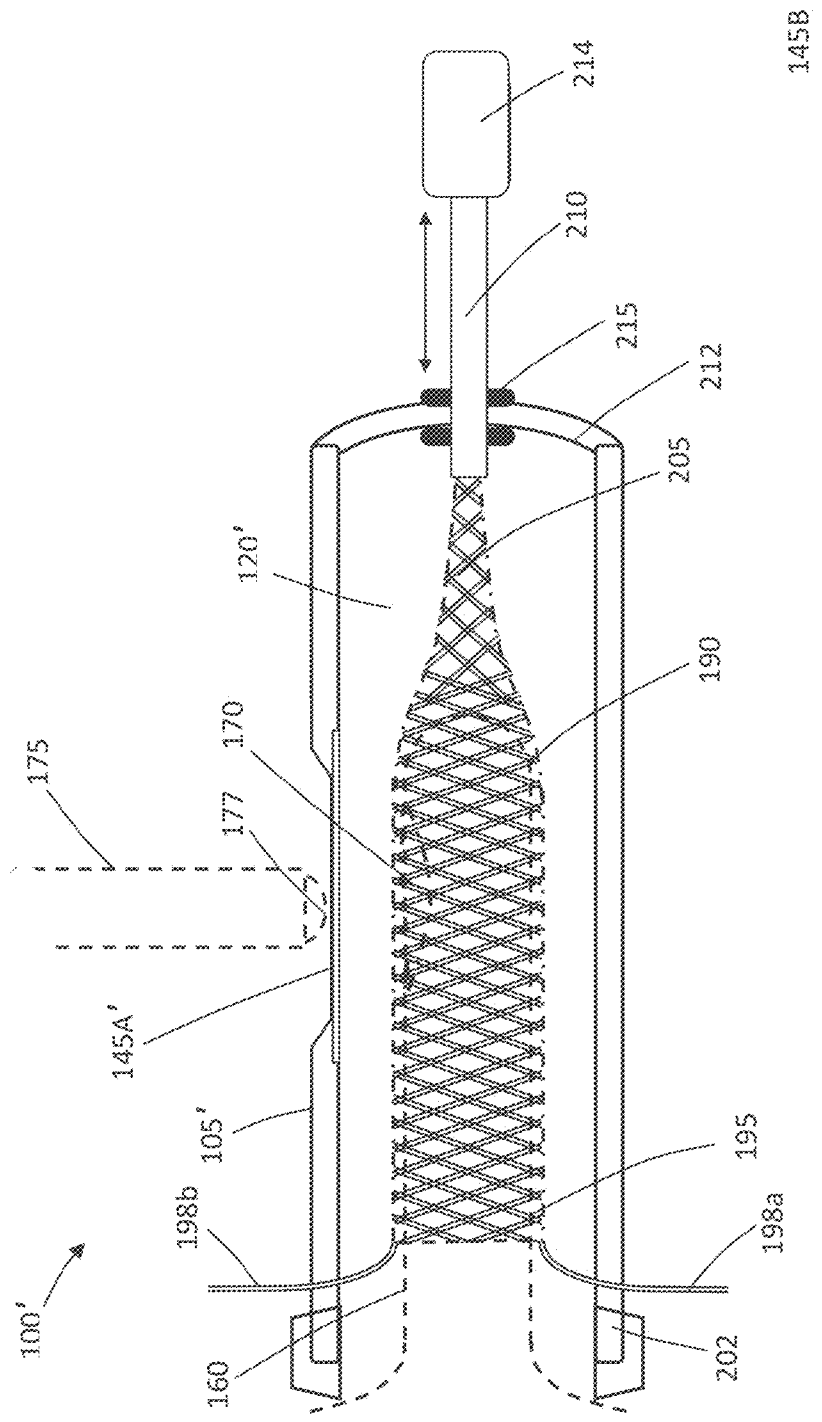
FIG. 3 is a longitudinal sectional view of another variation of an acoustic device similar to that of FIGS. 1-2.

Now turning to FIG. 3, another optional variation 100' of the invention is shown which has a tubular member 105' that is similar to the previous embodiment. In addition, a mechanism is provided for tensioning and stretching the penile shaft 160 and the plaque that is targeted for treatment with shock waves. In the schematic view of FIG. 3, a cylindrical axially extendable braided or woven structure or trap 190, sometimes called as a Chinese finger toy, can be used to engage and grip the penile shaft 160. Such a braided trap structure 190 comprises a uniquely woven material that expands in diameter when axially compressed and collapses in diameter when axially stretched. As can be seen in FIG. 3, the penile shaft 160 can be inserted into the woven trap 190 which is disposed in chamber 120' of the elongated tubular member 105'. In this variation, the proximal portion 195 of the woven trap 190 has at least one tether element and is shown with two tether elements 198*a* and 198*b* that are configured to extend through or around the proximal end portion 202 of the elongated tubular member 105' to thereby maintain the position of the proximal end 195 of the woven trap 190. The distal end 205 of the woven trap 190 is coupled to a movable tether of shaft 210 that extends through the distal end portion 212 of the elongated tubular member 105'. A finger grip 214 is provided at the distal end of shaft 210. A seal 215 is provided in the tubular member 105' to receive the shaft and to 210 to maintain the negative pressure in the interior chamber 120'. As can be understood in FIG. 3, the penile shaft 160 then can be engaged with the woven trap 190 and axially stretched in the distal direction by means moving the shaft 210 in the distal direction. In FIG. 3, it can be seen that the shock wave emitter 175 and working end 177 again is manually movable over the thin wall element 145A' in the outer surface of the tubular member 105'. The schematic view of FIG. 3 does not show the interior bladders that are adapted to support the penile shaft 160 and maintain the shaft in contact with the thin wall member 145A'. This is for convenience only, and the method of using the shockwave device 175 to treat plaque in the penile shaft 160 remains the same as described previously. The bendable central section of the tubular member 105' also is not shown for convenience. It should be appreciated that the woven trap 190 of FIG. 3, when used to treat Peyronie's disease, will not only manipulate the penile shaft 160 and the plaque 170 by lengthening the shaft, but will also straighten the penile shaft.

Figure 4:
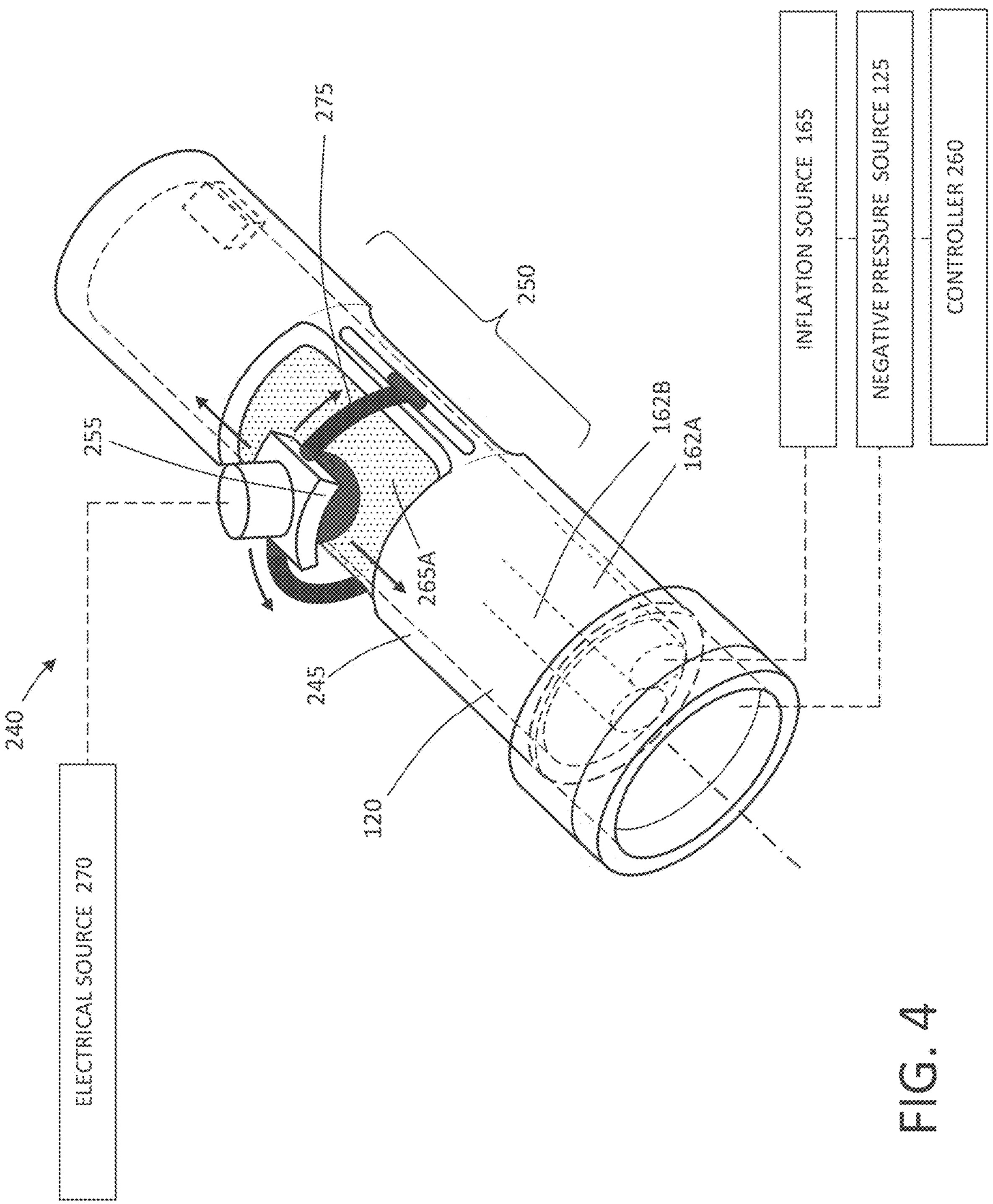
FIG. 4 is a perspective view of an alternative system adapted for treatment of Peyronie's disease where the acoustic transmitter is integrated into the tubular portion of the device.

Now turning to FIG. 4, another variation of the device 240 is shown that is similar to that of FIGS. 1 to 3. In this embodiment, the elongated tubular member 245 again has a medial portion 250 that allows for deflection of the tubular member to accommodate the penile shaft in a bent shape. This variation differs from the embodiment of FIG. 1 in that the shock wave emitter 255 is coupled to the tubular member 245 in a way that the acoustic emitter can be moved both axially and radially over the thin-wall element 265A that contacts the penile shaft. In this variation, the shock wave emitter 255 is typically an assembly or stack of piezoelectric elements coupled to an electrical source 270 that can deliver intense shock waves. In FIG. 4 a variation of the device includes a sliding collar 275 carrying the emitter 255 that is adapted to slide axially. Further, the emitter 255 is adapted to move radially or rotationally about sliding collar 275. In a variation, it can be appreciated that the movable collar 275 of emitter 255 of FIG. 4 can be coupled to a motor drive to move the acoustic emitter 255 both axially and rotationally in a pattern to automate the procedure. Such a motor drive can consist of a first electric motor to move the emitter axially and a second electric motor to move acoustic emitter 255 radially. Such motors (not shown) can be coupled to the acoustic emitter 255 and be controlled by the controller 260 to move the acoustic emitter 255 in a predetermined path. In all other respects, the interior chamber 120 and bladders 162A and 162B function as described previously.

In other variations, it should be appreciated that light energy mechanisms, electrical stimulus mechanisms, vibration mechanisms, cooling elements such as Peltier elements, and heating elements can be provided in the interior chamber of the treatment device to enhance treatment.

Although particular embodiments of the present invention have been described above in detail, it will be understood that this description is merely for purposes of illustration and the above description of the invention is not exhaustive. Specific features of the invention are shown in some drawings and not in others, and this is for convenience only and any feature may be combined with another in accordance with the invention. A number of variations and alternatives will be apparent to one having ordinary skills in the art. Such alternatives and variations are intended to be included within the scope of the claims. Particular features that are presented in dependent claims can be combined and fall within the scope of the invention. The invention also encompasses embodiments as if dependent claims were alternatively written in a multiple dependent claim format with reference to other independent claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of treating Peyronie's disease, comprising:
- positioning a penile shaft of a patient in an interior chamber of a device, wherein the penile shaft contacts a thin wall member within the interior chamber;
- causing negative pressure in the interior chamber around the penile shaft to increase blood inflow to thereby distend a corporal sinusoid, wherein the thin wall member spans along the interior chamber and is configured to maintain the negative pressure within the interior chamber; and
- moving an acoustic emitter over an exterior of the device while applying shock waves from the acoustic emitter to deliver shock waves to plaque in the penile shaft.

2. The method of treating Peyronie's disease of claim 1, wherein the negative pressure is from 50 mm Hg to 250 mm Hg.

3. The method of treating Peyronie's disease of claim 1, wherein moving the acoustic emitter comprises manually moving the acoustic emitter.

4. The method of treating Peyronie's disease of claim 1, wherein moving the acoustic emitter comprises automated movement of the acoustic emitter.

5. The method of treating Peyronie's disease of claim 1, wherein the applying step applies shock waves over a selected interval at a frequency of 1 to 5 Hz with an energy intensity of 0.10 $mJ/mm^2$ to 0.30 $mJ/mm^2$.

6. The method of treating Peyronie's disease of claim 5, wherein the selected interval is from 1 minute to 30 minutes.

7. The method of treating Peyronie's disease of claim 6, wherein the selected interval, frequency and energy are delivered in a series of treatments over time.

8. The method of treating Peyronie's disease of claim 1, wherein the shock waves modify the plaque.

9. The method of treating Peyronie's disease of claim 1, wherein positioning the penile shaft in the interior chamber comprises disposing the penile shaft in the interior chamber with distended corporal sinusoids in a non-tensioned shape.

10. The method of treating Peyronie's disease of claim 1, wherein applying shock waves is preceded by or contemporaneous with tensioning the penile shaft to thereby tension the plaque.

11. The method of treating Peyronie's disease of claim 10, wherein tensioning includes straightening the penile shaft.

12. The method of treating Peyronie's disease of claim 10, wherein the penile shaft is moved between non-tensioned and tensioned shaped during applying shockwaves.

13. A method of treating Peyronie's disease, comprising:
- positioning a penile shaft of a patient in a chamber, wherein the penile shaft contacts a thin wall member within the chamber;
- causing negative pressure in the chamber around the penile shaft for an interval sufficient to increase blood inflow to thereby distend a corporal sinusoid, wherein the thin wall member spans along the chamber and is configured to maintain the negative pressure within the chamber;
- straightening the penile shaft; and
- moving an acoustic emitter over an exterior of the chamber while applying shock waves from the acoustic emitter to deliver shock waves to plaque in the penile shaft.

14. The method of treating Peyronie's disease of claim 13, wherein the negative pressure is from 50 mm Hg to 250 mm Hg.

15. The method of treating Peyronie's disease of claim 13, wherein applying shock waves comprises applying shock waves at a frequency of 1 to 5 Hz with an energy intensity of 0.10 $mJ/mm^2$ to 0.30 $mJ/mm^2$.

16. The method of treating Peyronie's disease of claim 15, wherein applying shock waves comprises applying between 500 and 5,000 shockwaves in a treatment session.

17. The method of treating Peyronie's disease of claim 15, wherein applying shock waves comprises applying shock waves repeated over time in multiple sessions.

18. An acoustic tissue treatment system, comprising:
- an elongate tubular member extending about a central axis with an interior chamber having a proximal open end and a distal closed end and a central portion therebetween, wherein the elongate tubular member is configured for receiving a shaft of a mammalian penis, the elongate tubular member configured to transmit shock wave energy to the shaft, wherein the elongate tubular member comprises bendable sidewalls at the proximal open end and the distal closed end;

a contact structure comprising a thin wall portion interfacing the interior chamber and spanning between the bendable sidewalls, where the thin wall portion comprises a thickness less than a wall of the elongate tubular member;

wherein the central portion of the elongate tubular member is bendable relative to the central axis;

a negative pressure source in communication with the interior chamber; and a shockwave device adapted to deliver shock wave energy from an emitter to the shaft, where the shockwave device is configured to move independently over the elastomeric wall.

19. The acoustic tissue treatment system of claim 18, wherein the shockwave device is handheld for manually positioning the emitter in contact with the contact structure.

20. The acoustic tissue treatment system of claim 19, wherein the shockwave device is coupled to the tubular member for automated positioning of the emitter in contact with the contact structure.

21. The acoustic tissue treatment system of claim 19, wherein the contact structure extends radially around the elongate tubular member at least 60 degrees.

22. The acoustic tissue treatment system of claim 19, wherein the contact structure extends axially at least 10 mm.

23. The acoustic tissue treatment system of claim 18, further comprising a controller for controlling an operating parameter of the shockwave device.

24. The acoustic tissue treatment system of claim 23, wherein the negative pressure source is adapted to provide from 50 mm Hg to 250 mm Hg of negative pressure.

25. The acoustic tissue treatment system of claim 24, wherein the shockwave device is configured to apply shock waves at a frequency of 1 to 5 Hz with an energy of 0.10 $mJ/mm^2$ to 0.30 $mJ/mm^2$.

26. The acoustic tissue treatment system of claim 24, wherein the controller is configured to apply between 500 and 5,000 shockwaves in a treatment session.

27. The acoustic tissue treatment system of claim 18, wherein the elongate tubular member is bendable at least 10 degrees relative to the central axis.

* * * * *